United States Patent
Landbeck et al.

(10) Patent No.: US 10,059,302 B2
(45) Date of Patent: Aug. 28, 2018

(54) BELT TENSIONER

(71) Applicant: TRW Automotive GmbH, Alfdorf (DE)

(72) Inventors: Adrian Landbeck, Schwäebisch Gmüend (DE); Bernd Hofmann, Aalen (DE); Alexander Waidmann, Schwäebisch Gmüend (DE)

(73) Assignee: TRW Automotive GmbH (DE)

( * ) Notice: Subject to any disclaimer, the term of this patent is extended or adjusted under 35 U.S.C. 154(b) by 245 days.

(21) Appl. No.: 14/892,615

(22) PCT Filed: May 27, 2014

(86) PCT No.: PCT/EP2014/001417
§ 371 (c)(1),
(2) Date: Nov. 20, 2015

(87) PCT Pub. No.: WO2014/194993
PCT Pub. Date: Dec. 11, 2014

(65) Prior Publication Data
US 2016/0114762 A1    Apr. 28, 2016

(30) Foreign Application Priority Data

Jun. 5, 2013 (DE) .................. 10 2013 009 393

(51) Int. Cl.
*B60R 22/36* (2006.01)
*B60R 22/46* (2006.01)

(52) U.S. Cl.
CPC ...... *B60R 22/4633* (2013.01); *B60R 22/4628* (2013.01); *B60R 2022/468* (2013.01); *B60R 2022/4642* (2013.01)

(58) Field of Classification Search
CPC .................. B60R 22/4633; B60R 2022/468
(Continued)

(56) References Cited

U.S. PATENT DOCUMENTS

| 5,495,790 | A  |   | 3/1996 | Greiner |
| 6,454,306 | B1 | * | 9/2002 | Cunningham ...... B60R 22/4633 |
| | | | | 102/202.14 |

(Continued)

FOREIGN PATENT DOCUMENTS

| DE | 20113773 | 8/2002 |
| DE | 20215542 | 4/2003 |

(Continued)

*Primary Examiner* — Toan To
(74) *Attorney, Agent, or Firm* — Tarolli, Sundheim, Covell & Tummino LLP

(57) ABSTRACT

The invention provides in a best tensioner (10), especially a rotary tensioner, for a seat belt comprising an elongate and preferably cylindrical pressure cylinder (129, a piston (18) movably supported in the pressure cylinder (12) in the longitudinal direction which is adapted to be pressurized with fluid under pressure and thus to be moved into a tensioning direction (S), a thrust means (20) interacting with the piston (18) and a stop (24) provided on the inside (38) of the pressure cylinder (12) to which the piston (18) can be adjacent in the tensioning direction (S) at an end position at which the piston (18) seals the pressure cylinder (12), that the stop (24) is made of a plastically deformable material and is plastically deformed by the piston (18) at the end position so that the piston is in sealing contact with the inside of the pressure cylinder (12).

23 Claims, 2 Drawing Sheets

(58) Field of Classification Search
USPC ......... 280/806; 242/374; 102/530, 531, 202, 102/202.1
See application file for complete search history.

(56) References Cited

U.S. PATENT DOCUMENTS

| | | | | |
|---|---|---|---|---|
| 7,624,940 | B2* | 12/2009 | Kitazawa | ............ B60R 22/4633 |
| | | | | 242/374 |
| 9,718,439 | B2* | 8/2017 | Nagata | ................ B60R 22/4628 |
| 2010/0051734 | A1* | 3/2010 | Yamada | ................ B21C 23/205 |
| | | | | 242/374 |
| 2012/0032017 | A1 | 2/2012 | Yanagawa et al. | |
| 2012/0160947 | A1* | 6/2012 | Nagata | ................ B60R 22/4628 |
| | | | | 242/374 |
| 2014/0084099 | A1* | 3/2014 | Miyoshi | ............. B60R 22/4633 |
| | | | | 242/374 |
| 2014/0110518 | A1* | 4/2014 | Nakayama | .......... B60R 22/4633 |
| | | | | 242/374 |
| 2014/0145021 | A1* | 5/2014 | Yanagawa | ........... B60R 22/4633 |
| | | | | 242/374 |
| 2014/0175210 | A1* | 6/2014 | Betz | .................... B60R 22/1955 |
| | | | | 242/382 |
| 2014/0224912 | A1* | 8/2014 | Yanagawa | ........... B60R 22/4633 |
| | | | | 242/374 |
| 2014/0224915 | A1* | 8/2014 | Yanagawa | ............... B60R 22/46 |
| | | | | 242/382 |
| 2015/0274122 | A1* | 10/2015 | Yanagawa | ........... B60R 22/4633 |
| | | | | 242/379.1 |

FOREIGN PATENT DOCUMENTS

| | | |
|---|---|---|
| DE | 10334333 | 4/2004 |
| DE | 102006044703 | 4/2008 |
| DE | 102010051463 | 5/2012 |
| DE | 102010054846 | 6/2012 |
| DE | 102011014326 | 9/2012 |

* cited by examiner

BELT TENSIONER

RELATED APPLICATIONS

This application corresponds to PCT/EP2014/001417, filed May 27, 2014, which claims the benefit of German Application No. 10 2013 009 383.7, filed Jun. 5, 2013, the subject matter of which are incorporated herein by reference in their entirety.

BACKGROUND OF THE INVENTION

The invention relates to a belt tensioner, especially a rotary tensioner, for a seat belt, comprising an elongate, preferably cylindrical pressure cylinder a piston movably supported in the pressure cylinder in the longitudinal direction adapted to be loaded by pressurized fluid and thus to be moved in a tensioning direction, a thrust means interacting with the piston and a stop provided on the inside of the pressure cylinder against which the piston may abut in the tensioning direction at an end position at which the piston seals the pressure cylinder.

From prior art belt tensioners comprising an inflator are known which include a pressure cylinder in which a piston movably supported in the longitudinal direction can be moved in the tensioning direction by fluid under pressure. A thrust means interacting with the belt reel, for example a toothed rack, is displaced by the piston, thus causing the belt reel to be rotated in a tensioning direction. On the inside of the pressure cylinder a stop is provided against which the piston can abut in the tensioning direction and thus cannot be moved out of the pressure cylinder. The stop and/or the piston are configured so that the pressure cylinder is sealed when the piston abuts against the stop. This reliably prevents the fluid under pressure, for example hot gas from an inflator, from escaping from the pressure cylinder.

SUMMARY OF THE INVENTION it is the object of the invention to provide a belt tensioner of the type as described in the beginning which exhibits improved sealing of the pressure cylinder and improved abutting behavior of the piston against the stop.

For achieving the object a belt tensioner, especially a rotary tensioner, for a seat belt is provided comprising an elongate and preferably cylindrical pressure cylinder, a piston movably supported in the pressure cylinder in the longitudinal direction which is adapted to be pressurized by fluid under pressure and thus to be moved in the tensioning direction, a thrust means interacting with the piston and a stop provided on the inside of the pressure cylinder against which the piston can abut in the tensioning direction at an end position at which the piston seals the pressure cylinder. In accordance with the invention, the stop is provided to consist of plastically deformable material and to be plastically deformed by the piston at the end position so that the piston is in sealing contact with the inside of the pressure cylinder.

In the previously known belt tensioners the stop is not deformed when the piston is moved to the end position. Sealing is performed either by the abutment of the piston against the stop, wherein both the piston and the stop have to be manufactured with minimum manufacturing tolerance so as to obtain reliable sealing. Alternatively, an additional sealing element may be arranged which is deformed by the increasing pressure in the pressure cylinder so that it is peripherally adjacent to the inside of the pressure cylinder in the circumferential direction. The deformation of the stop as provided according to the invention improves the sealing between the piston and the stop, as the stop can be deformed so that the piston is in sealing contact with the inside of the pressure cylinder. The belt tensioner according to the invention moreover offers the advantage that the piston can be decelerated more slowly by deforming the stop, wherein the decelerating behavior of the piston can be influenced by the choice of material of the stop and, resp., of the piston and by the shape of the stop.

The stop may be formed by a constriction of the diameter of the pressure cylinder, for example, thus enabling a stop to be formed in the pressure cylinder by simple means. The stop is especially formed by a peripheral constriction in the circumferential direction so that the piston is peripherally adjacent completely to the inside of the pressure cylinder in the circumferential direction and thus proper sealing can be achieved. In addition, the piston is prevented from tilting, which might occur due to unilateral deceleration of the piston.

The deceleration performance of the piston can be influenced by the geometry of the stop. For this purpose, the constriction may have a shoulder by which the piston is quickly slowed down as from the beginning of the decelerating process a large amount of material has to be deformed. As an alternative, the constriction may be formed by an inclination on the inside of the pressure cylinder, which causes the decelerating force to increase as late as with an increasing stopping distance, as the amount of material to be displaced increases with an increasing stopping distance.

The piston can displace the material of the stop, for example. It is also imaginable, however, that the piston deforms the material of the stop by chipping, wherein especially a non-detaching chip is produced so that no material residues of the stop can fall out of the pressure cylinder. For this, the piston includes, especially at the leading end in the tensioning direction, a cutting edge interacting with the stop.

Said cutting edge may be provided exclusively in the circumferential direction in the area of the stop. Preferably, the cutting edge is formed to be peripheral in the circumferential direction of the piston so that a cutting effect is achieved independently of the orientation of the piston in the pressure cylinder.

The diameter of the piston decreases opposite to the tensioning direction, for example. The elongate pressure cylinder can also be configured to be curved or arc-shaped in portions. A piston having a continuously constant diameter may get jammed in a curve depending on the radius of curvature of the pressure cylinder so that any further movement is possible only by deforming the piston or the pressure cylinder. Since the piston has a reduced diameter opposite to the tensioning direction, it is ensured that only the leading portion of the piston deforming the stop is adjacent to the inside of the pressure cylinder. The reduction of the diameter of the piston is configured so that the rear area of the piston has a sufficient distance from the inside of the pressure cylinder throughout, i.e. also in the curved portion of the pressure cylinder, so that the piston can be moved even through curvatures of the pressure compartment.

The piston may be integrally formed, for example. It is also possible, however, that the piston has a multi-part design and includes a decelerating element interacting with the stop as well as a sealing element provided in the tensioning direction downstream of the decelerating element, with the sealing element sealing the pressure cylinder. In this embodiment, the decelerating element is preferably made of a hard material adapted to deform the stop. The sealing element, on the other hand, is made of a soft material which can be adjacent to the inside of the pressure cylinder by deformation.

Preferably the decelerating element and the sealing element are connected by adhesive force closure and/or by form closure so that they cannot be separated from each other and upon deformation of the stop and, resp., upon reaching the end position of the piston the pressure cylinder is sealed by the sealing element.

In order to positively connect the decelerating element and the sealing element to each other, the decelerating element comprises an extension, for example, preferably projecting on the rear side and extending into the sealing element. The sealing element includes an opening corresponding to the extension into which the extension extends. The opening may include an undercut in which a thickened portion of the extension engages.

For example, the piston comprises an especially convex or partly spherical contact surface for the thrust medium. Irrespective of the shape of the pressure member, in this way a reliable contact is made between the piston and the thrust medium. Due to the curvature, the thrust medium contacts the piston so that the thrust force always acts on the thrust medium in the longitudinal direction of the pressure cylinder.

The thrust medium is in the form of a toothed rack or a flexible thrust rod which interacts, for example, with a gearwheel driving a belt reel. Such flexible thrust rod includes e.g. a tooth profile which drives the gearwheel. Depending on the material of the flexible thrust rod, it can also be manufactured without any profile, wherein the teeth of the gearwheel impress into the thrust means during displacement thereof.

For driving the piston an inflator is provided, for example, which is in fluid communication with the pressure cylinder and provides the fluid.

BRIEF DESCRIPTION OF THE DRAWING

Further advantages and features will be evident from the following description in combination with the enclosed drawings, in which.

DESCRIPTION

Figure 1:
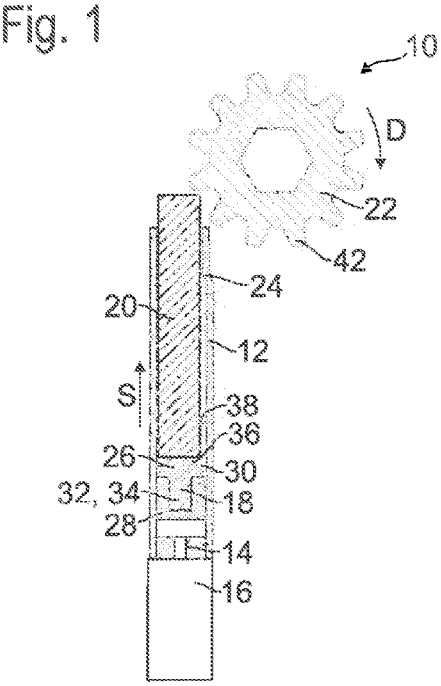
FIG. 1 shows a belt tensioner according to the invention in the longitudinal section in an initial state.
Figure 2:
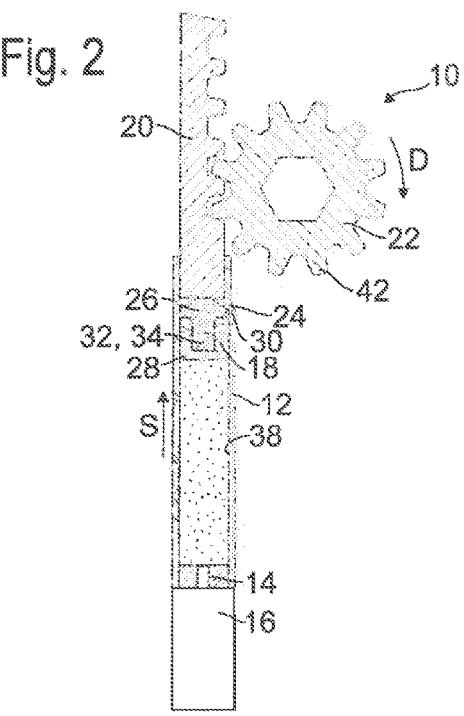
FIG. 2 shows the belt tensioner from FIG. 1 after a tensioning operation.

In FIGS. 1 and 2 a belt tensioner 10 for a vehicle is illustrated comprising an elongate cylindrical pressure cylinder 12 to which an inflator 16 is connected via a duct 14. In the pressure cylinder 12 a piston 18 movably supported in a tensioning direction S and a thrust means 20 interacting with a gearwheel 22 are provided, in this case a thrust rod being arranged in the tensioning direction S ahead of the piston 18 and being adjacent to the latter.

At the front end of the pressure cylinder 12 in the tensioning direction S a stop 24 is provided for delimiting the motion of the piston 18 in the tensioning direction S. The stop 24 is formed by a unilateral constriction of the pressure cylinder 12, the diameter of the pressure cylinder being reduced so that it is smaller than the diameter of the piston 18.

Figure 3:
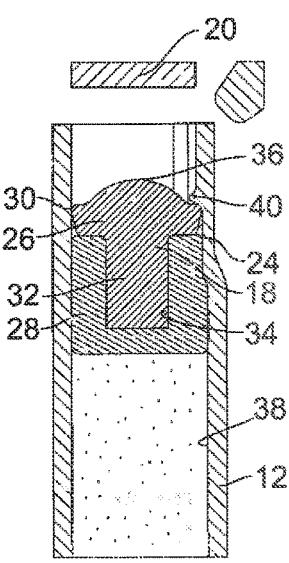
FIG. 3 shows a detailed view of the belt tensioner from FIG. 2.

As evident especially from FIG. 3, the piston 18 is structured in two parts and includes a decelerating element 26 and a sealing element 28 located downstream thereof in the tensioning direction S. The decelerating element 26 is made of hard material. The sealing element 28 consists of soft material.

The decelerating element 28 is mushroom-shaped in the embodiment illustrated here and at its front end in the tensioning direction S includes a cutting edge 30 defining the maximum diameter of the piston 18.

In the tensioning direction S behind the cutting edge 30 the diameter of the piston 18 end, resp., of the decelerating element 26 decreases with the decelerating element 26 being substantially tapered in this portion opposite to the tensioning direction S.

On the rear side the decelerating element further includes an extension 32 extending into a recess 34 of the sealing element 28 so that they are positively connected to each other.

On the front side of the decelerating element 26 is provided a contact surface 36 for the thrust means 20 projecting in partly spherical shape in the tensioning direction S.

As is visible in FIG. 1, the diameter of the pressure cylinder 12 is selected and the decelerating element 26 is supported in the pressure cylinder so that the piston 18 can move freely in the pressure cylinder 12. The sealing element 28 made of a soft material has a slightly larger diameter so that it seals the lower area of the pressure cylinder 12 with respect to FIG. 1 against the upper area.

Pressurized fluid escaping from the inflator 16 may flow through the duct 14 into the pressure cylinder 12, thus causing the piston 18 to move in the tensioning direction S by the increasing pressure. The piston 18 moving in the tensioning direction S pushes the thrust means 20 in the tensioning direction S out of the pressure cylinder 12. The thrust means 20 engages in the gearwheel 22 and rotates the same in a direction of rotation D. The gearwheel 22 is coupled to a belt reel not shown here. The belt reel is rotated by the rotation of the gearwheel 22 in the direction of rotation D so that webbing is wound onto the bolt reel or a cable coupled to the belt buckle is wound up and hence tensioning of the seat belt is performed.

The piston 18 is moved to the tensioning direction S until it abuts against the stop 24 of the pressure cylinder 12. The stop 24 is made of a plastically deformable material so that the stop 24 is deformed by the piston 18 and the piston 18 is slowed down. In addition, the pressure cylinder 12 is additionally sealed by the deformation of the stop 24. This ensures that the pressurized fluid, for example hot gas, is prevented from escaping from the pressure cylinder 12 into the vehicle interior.

The stop 24 is especially formed by a plastically constricted portion of the tube constituting the pressure cylinder 12.

In addition, the sealing element 28 arranged behind the decelerating element 26 is urged against the decelerating element 26 by the pressure increasing in the pressure cylinder 12, causing the decelerating element to deform and additionally sealing between the inside of the pressure cylinder 12 and the piston 18.

In the embodiment shown here the material of the stop 24 is deformed by chipping by the cutting edge 30 of the decelerating element 26, wherein a chip 40 is formed. The cutting edge 30 and the material of the stop 24 are formed so that a non-detaching chip 40 is formed, viz. no material of the stop 24 can leave the pressure cylinder 12.

The thrust means 20 is a flexible thrust rod having no profile. The flexible thrust rod is made of relatively soft material so that the teeth 42 of the gearwheel 22 can impress into the thrust rod, thus causing a positive connection between the thrust means 20 and the gearwheel 22.

Instead of such flexible thrust rod, also a thrust rod including an already embossed profile or a rigid toothed rack may be employed. Preferably a one-piece thrust means is used.

Figure 4:
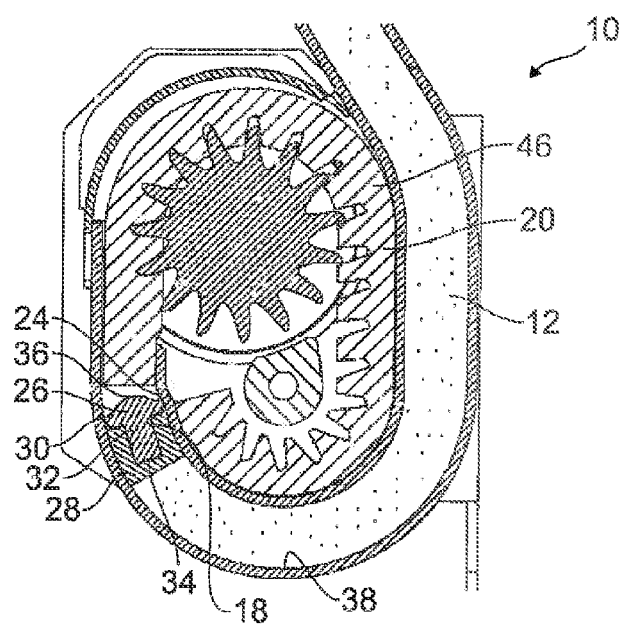
FIG. 4 shows a second embodiment of a belt tensioner according to the invention shortly before the end of a tensioning operation.
Figure 5:
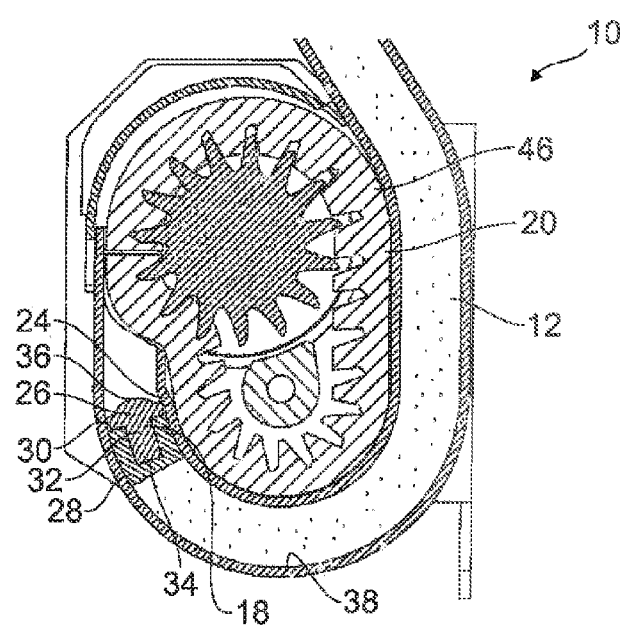
FIG. 5 shows the belt tensioner from FIG. 4 after completion of the tensioning operation.

A second embodiment of said belt tensioner 10 is illustrated in FIGS. 4 and 5. The structure of the belt tensioner 10 substantially corresponds to the belt tensioner 10 shown in FIGS. 1 to 3. Deviating from said embodiment, the pressure cylinder 12 is configured to be elongate but curved and substantially extends about the gearwheel 22 driving the belt reel. Furthermore, a receiving chamber 46 for the thrust means 20 is provided which extends inside the pressure cylinder 12 about the gearwheel 22.

In this embodiment, too, the piston 18 is moved by the pressurized fluid in a tensioning direction S, until the piston 18 abuts against the stop 24 and deforms the same.

As is evident in FIG. 5, the receiving chamber 46 is designed so that it is adapted to completely accommodate the thrust means 20, in this case equally a flexible thrust rod having no profile. After the tensioning operation the thrust means has completely left the pressure cylinder 12. Thus the gearwheel 22 can be moved by the thrust means 20 after the tensioning operation.

Due to the bending of the pressure cylinder 12, this embodiment requires the diameter of the piston 18 and, resp., of the decelerating element 26 to decrease starting from the cutting edge 30 opposite to the tensioning direction S so that merely the cutting edge 30 is adjacent to the inside 38 of the pressure cylinder 12.

The diameter of the piston 18 decreasing opposite to the tensioning direction ensures that the portion of the piston 18 and, resp. of the decelerating element 26 located behind the cutting edge is not adjacent to the inside 38 of the pressure cylinder 12 in the curved portion of the pressure cylinder 12, which might cause the piston 13 to tilt in the pressure cylinder 12 before reaching the end position.

In both illustrated embodiments the stop is formed by a unilateral constriction of the wall of the pressure cylinder 12. It is also imaginable, however, that a constriction completely peripheral in the circumferential direction is provided, thus causing the piston 18, upon reaching the stop 24, to be completely peripherally adjacent to the stop 24 with the cutting edge 30. As a matter of course, this is also applicable to the preceding embodiment.

The cutting edge 30 may be provided exclusively in the area of the stop 24. It is also possible, however, that the cutting edge 30 is configured to be peripheral in the circumferential direction so that the cutting edge 30 may always be adjacent to the stop 24 and deform the same even upon rotation of the piston 18.

The piston 18 and, resp., the decelerating element can also deform the stop 24 in a different way, however. For this purpose, no cutting edge 30 is required.

In the embodiments shown here the piston 18 is formed in two parts comprising a decelerating element 26 and a sealing element 23. They can be interconnected either by form closure and/or by adhesive force closure so that they are always moved jointly in the pressure cylinder 12. However, it is also possible to manufacture the piston 18 in one piece, i.e. of one material.

The partly spherical contact surface offers the advantage that especially in the embodiment shown in FIGS. 4 and 5 including a curved pressure cylinder 12 a reliable contact is always established between the piston 18 and the thrust means 20, wherein the direction of the pressure force acting on the thrust means 20 always extends in the longitudinal direction of the pressure cylinder 12. The contact surface 36 may also have a different, for example convex or planar, configuration.

Depending on the embodiment, the contact surface may cover the entire front face of the piston 18 or merely part of the front side, as in the embodiments shown here.

The slow-down characteristic of the piston 18 can be adapted at will by the shape or geometry of the stop 24 and/or the constriction.

It is also imaginable that the diameter is progressively reduced.

Furthermore, it is possible that the diameter of the pressure cylinder 12 is continuously tapered, thus causing the braking performance to increase with an increasing displacement distance.

However, the stop 24 may also be formed differently, for example by projections arranged on the inside of the pressure cylinder 12 or by other components.

The invention claimed is:

1. A belt tensioner (10) for a seat belt comprising an elongate and cylindrical pressure cylinder (12), a piston (18) movably supported in the pressure cylinder (12) in the longitudinal direction which is adapted to be pressurized with fluid under pressure and thus to be moved in a tensioning direction (S), a thrust means (20) separate from and interacting with the piston (18) and a stop (24) provided on the inside (38) of the pressure cylinder (12) to which the piston (18) can be adjacent in the tensioning direction (S) at an end position at which the piston (18) seals the pressure cylinder (12), wherein the stop (24) is made of a plastically deformable material and is plastically deformed by the piston (18) at the end position so that the piston is in sealing contact with the inside of the pressure cylinder (12).

2. The belt tensioner according to claim 1, wherein the stop (24) is formed by a constriction of the diameter of the pressure cylinder (12), by a constriction peripheral in the circumferential direction.

3. The belt tensioner according to claim 2, wherein the constriction forms a shoulder or an inclination at the inside (38) of the pressure cylinder (12).

4. The belt tensioner according to claim 1, wherein the piston (18) includes, at a front end viewed in the tensioning direction (S), a cutting edge (30) which is peripheral in the circumferential direction and interacts with the stop (24).

5. The belt tensioner according to claim 1, wherein the diameter of the piston (18) decreases opposite to the tensioning direction (S), wherein the piston is tapered at least in portions.

6. The belt tensioner according to claim 1, wherein the piston (18) comprises a decelerating element (26) interacting with the stop (24) and a sealing element (28) provided in the tensioning direction (S) downstream of the decelerating element (26), wherein the sealing element (28) seals the pressure cylinder (12).

7. The belt tensioner according to claim 6, wherein the decelerating element (26) and the sealing element (28) are interconnected by adhesive force closure and/or form closure.

8. The belt tensioner according to claim 6, wherein the decelerating element (26) includes an extension (32) projecting from the rear side which extends into the sealing element (28).

9. The belt tensioner according to claim 1, wherein the piston (18) includes an convex or partly spherical contact surface (36) for the thrust means (20).

10. The belt tensioner according to claim 1, wherein the thrust means (20) is a toothed rack or a flexible thrust rod which interacts with a gearwheel (22) driving a belt reel.

11. The belt tensioner according to claim 1, wherein an inflator (16) is provided which is fluid-communicated with the pressure cylinder (12) and provides the fluid.

12. The belt tensioner according to claim 1, wherein the sealing contact between the piston and the pressure cylinder prevents fluid flow across the piston.

13. A rotary belt tensioner for a seat belt, comprising:
a pressure cylinder extending in a tensioning direction and including a side wall defining an interior, a stop extending inward from the side wall into the interior;
a piston positioned within the interior for movement in the tensioning direction; and
a thrust means separate from and movable by the piston in the tensioning direction upon activation of the belt tensioner to apply pressurized fluid to the piston, wherein the piston plastically deforms the stop and has an end position in sealing contact with the side wall of the pressure cylinder.

14. The rotary belt tensioner according to claim 13, wherein the stop is a constriction extending radially inward towards a center line of the pressure cylinder.

15. The rotary belt tensioner according to claim 13, wherein the stop is formed by a unilateral constriction of the pressure cylinder.

16. The rotary belt tensioner according to claim 13, wherein a front end of the piston includes a cutting edge defining a maximum diameter of the piston and plastically deforming the stop.

17. The rotary belt tensioner according to claim 16, wherein the piston tapers inward from the cutting edge in a direction extending opposite to the tensioning direction.

18. The rotary belt tensioner according to claim 13, wherein the piston comprises:
a decelerating element for plastically deforming the stop; and
a sealing element connected to a rear side of the decelerating element for providing sealing contact between the piston and the side wall.

19. The rotary belt tensioner according to claim 18, wherein the decelerating element and the sealing element are interconnected by at least one of adhesive force closure and form closure.

20. The rotary belt tensioner according to claim 18, wherein the decelerating element includes an extension projecting from a rear side which extends into the sealing element.

21. The rotary belt tensioner according to claim 18, wherein the sealing element is formed from a material that is softer than a material of the decelerating element.

22. The rotary belt tensioner according to claim 13, wherein the piston includes a domed contact surface for engaging the thrust means.

23. The rotary belt tensioner according to claim 13, wherein the sealing contact between the piston and the pressure cylinder prevents fluid flow across the piston.

* * * * *